3,155,693
6,7-DICHLOROESTRATRIENES
Fred A. Kincl, Atherton, Calif., assignor to Syntex Corporation, Panama, Panama, a corporation of Panama
No Drawing. Filed Oct. 11, 1963, Ser. No. 315,713
Claims priority, application Mexico July 31, 1963
17 Claims. (Cl. 260—397.4)

This invention relates to novel cyclopentanopolyhydrophenanthrene derivatives and to processes for their preparation.

More particularly, this invention relates to novel 6,7-dichloroestratriene derivatives represented by the general formula:

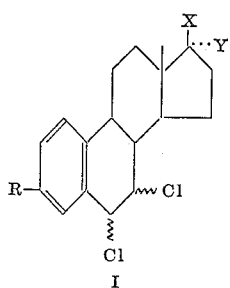

wherein R represents a hydroxyl group, an acyloxy group containing less than 12 carbon atoms, e.g., an acetoxy group, or a monovalent ether group, i.e., a substituted or unsubstituted monovalent acyclic, carbocyclic or heterocyclic radical, preferably one having less than 8 carbon atoms, e.g., a lower alkyl (including cycloalkyl) group, such as methyl, ethyl, n-propyl, $\beta$-hydroxyethyl, cyclopentyl, cyclohexyl, and the like, an aryl group, such as phenyl, benzyl, anisyl, and the like, or a heterocyclic group, such as tetrahydropyranyl and the like, attached to an oxygen atom, which in turn is attached to the steroid nucleus; X represents a hydroxyl group or an acyloxy group containing less than 12 carbon atoms; Y represents hydrogen, a lower alkyl group, e.g., methyl, ethyl, propyl, and the like, a lower alkenyl group, e.g., vinyl and the like, or a lower alkinyl group, e.g., ethinyl and the like; X and Y taken together can also represent a keto group, and the symbol $\xi$ indicates that the chlorine atoms attached thereby to the 6- and 7-positions of the steroid nucleus can each be in either the $\alpha$- or the $\beta$-configuration, thus giving rise to four separate classes of isomers, i.e., the $6\alpha,7\alpha$-, $6\alpha,7\beta$-, $6\beta,7\alpha$- and $6\beta,7\beta$-dichloro derivatives.

The acyl and acyloxy groups referred to herein are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The compounds of the present invention, represented by Formula I hereinabove have weak estrogenic activity but good pituitary inhibiting potency, and thus are especially valuable for use as fertility control agents.

These compounds can be prepared by processes which can be represented schematically as follows:

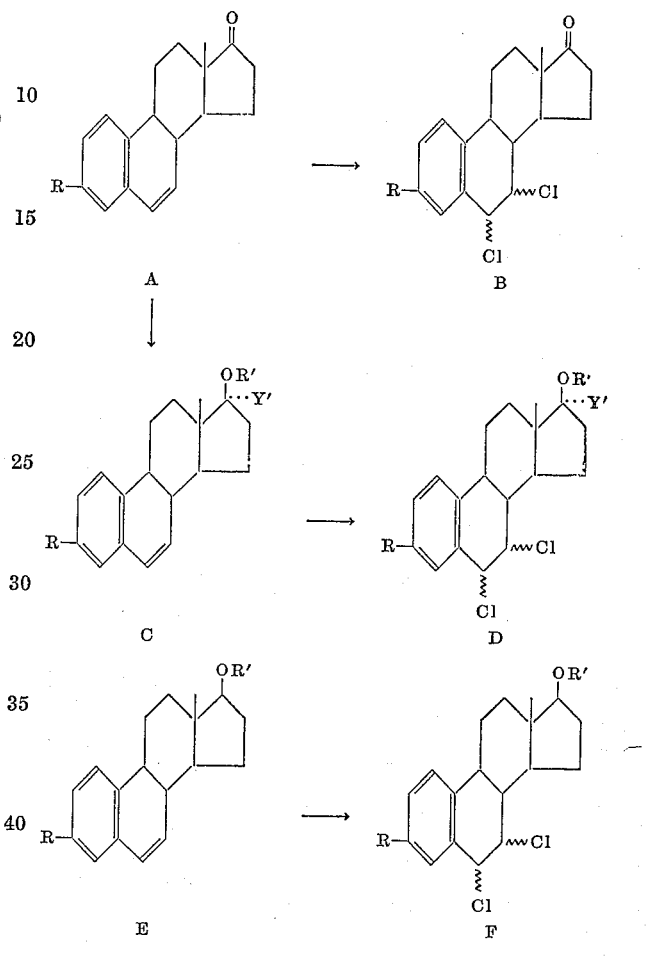

In these formulas R is as described for Formula I hereinabove, $R^1$ represents hydrogen or an acyl group containing less than 12 carbon atoms, and $Y^1$ represents a lower alkyl, lower alkenyl or lower alkinyl group.

In going from $\Delta^6$-dehydroestrone or a 3-ester or ether thereof, e.g., $\Delta^6$-dehydroestrone 3-acetate (A; R=acetoxy)

to the corresponding 6,7-dichloro derivatives, as shown in reaction sequence A→B, or from $\Delta^6$-dehydroestradiol or a derivative thereof esterified or etherified at either or both of positions 3 and 17, e.g., $\Delta^6$-dehydroestradiol 17-monoacetate (E; R=OH, $R^1$=acetyl), to the corresponding 6,7-dichloro derivatives, as shown in reaction sequence E→F, the starting steroids, all of which are obtained as described in U.S. Patent No. 2,705,237 to Djerassi et al., are simply treated with a chlorinating agent which adds chlorine to ethylenic double bounds, e.g., chlorine itself, N-chlorosuccinimide, and the like, and preferably the former, thus producing the corresponding 6,7-dichloro-estratrienes.

This reaction will be carried out in an inert organic solvent, preferably a chlorinated hydrocarbon such as chloroform, carbon tetrachloride, methylene chloride, and the like, or an ether such as dioxane, tetrahydrofuran, diethyl ether, and the like, or a mixture thereof, at a temperature of from about $-20°$ C. to about $30°$ C. and preferably at from about $-10°$ C. to about $5°$ C., for from about 5 minutes or less to about 2 hours. Generally, the chlorinated agent will be employed in at least about the stoichiometric amount necessary to add a chlorine atom at each of positions 6 and 7, with about a 10-20% excess, especially where the chlorinating agent is elemental chlorine, being preferred.

Although the order of addition of the reactants is not critical, it is preferred that the steroid starting material be dissolved in the inert organic solvent prior to the addition of the chlorinating agent, as this has been found to minimize the possibility of side reactions taking place. The temperature constituting the upper limit of the above-stated broad range has been chosen for the same reason, for although higher temperatures can be employed, if desired, the possibility of side reactions increases as the reaction temperature is increased appreciably above about $30°$ C.

The 6,7-dichloro derivatives of 17α-lower alkyl, -lower alkenyl or -lower alkinyl-$\Delta^6$-dehydroestradiol and the corresponding 3 and/or 17-esters and ethers thereof can be prepared as shown in reaction sequence A→C→D hereinabove. The first step in this procedure involves converting $\Delta^6$-dehydroestrone or a 3-ester or ether thereof to the corresponding 17α-lower alkyl, -lower alkenyl or -lower alkinyl-$\Delta^6$-dehydroestradiol derivative. This is readily accomplished in known manner by reacting the 17-keto starting material with a lower alkyl, lower alkenyl or lower alkinyl magnesium halide, e.g., methyl, vinyl or ethinyl magnesium bromide, or, in the case of the 17α-lower alkinyl derivatives, by reacting the 17-keto starting material with acetylene in the presence of potassium t-amylate or with an alkoxyacetylene, e.g., ethoxyacetylene, in the presence of an alkyl magnesium halide, e.g., ethyl magnesium bromide, which gives rise to the corresponding 17α-ethinyl-17β-alkoxy derivatives directly. The resulting 17α-lower alkyl, -lower alkenyl or -lower alkinyl $\Delta^6$-dehydroestradiol derivatives is then chlorinated in the manner described hereinabove to produce the corresponding 6,7-dichloro derivative in its various isomeric forms.

In order that those skilled in the art can more fully understand the present invention, the following examples are set forth. These examples are given solely by way of illustration, and should not be considered as expressing limitations unless so set forth in the appended claims. All percentages are by weight, unless otherwise stated.

*Example I*

To a solution of 3 grams of $\Delta^6$-dehydroestrone 3-acetate in 77.5 ml. of carbon tetrachloride, contained in a suitable reaction vessel immersed in an ice-salt bath (a mixture of ice and sodium chloride which gave a temperature between $-10°$ C. and $0°$ C.), there was added sufficient chlorine gas to give a 0.25 N chlorine solution. The resulting reaction mixture was allowed to stand for 5 minutes, following which it diluted with cold water and extracted several times with methylene chloride. The combined extracts were then washed with a 5% aqueous sodium bicarbonate solution, the solvent was removed under vacuum and the residue was recrystallized from diethylether-methanol. By careful chromatography, 6α,7α-dichloroestrone 3-acetate, 6β,7α-dichloroestrone 3-acetate, 6α,7β-dichloroestrone 3-acetate and 6β,7β-dichloroestrone 3-acetate were separated from the recrystallized residue, with the first two of these isomers, namely, the 6α,7α, and 6β,7α-isomers, predominating.

*Examples II–VIII*

The procedure of Example I was repeated in each of these examples with one exception, namely $\Delta^6$-dehydroestrone 3-actate was replaced by $\Delta^6$-dehydroestrone, $\Delta^6$-dehydroestrone 3-methyl ether, $\Delta^6$-dehydroestradiol, $\Delta^6$-dehydroestradiol 3-benzylether, $\Delta^6$-dehydroestradiol 17-acetate, $\Delta^6$-dehydroestradiol 3,17-diacetate and $\Delta^6$-dehydroestradiol-3-methyl ether 17-acetate, respectively. In each case, the corresponding 6α,7α-, 6β,7α-, 6α, 7β- and 6β,7β-dichloro derivatives, i.e., of estrone, estrone 3-methyl ether, estradiol, estradiol 3-benzyl ether, estradiol 17-acetate, estradiol 3,17-diacetate and estradiol 3-methyl ether 17-acetate, respectively, were obtained, with the 6α,7α- and 6β,7α-isomers predominating in each case.

*Example IX*

To a solution of 5 grams of $\Delta^6$-dehydroestrone-3-methyl-ether in 250 cc. of thiophene-free benzene, contained in a suitable reaction vessel equipped with a reflux condenser, there was added 27.5 cc. of a 4 N solution of methyl magnesium bromide in dimethylether. The resulting reaction mixture, from which moisture was rigorously excluded, was refluxed for three hours and then allowed to cool to room temperature. The cooled mixture was then cautiously treated with an excess of an aqueous ammonium chloride solution, following which the product was isolated by extraction of the reaction mixture with ethyl acetate. The resulting extract was washed with water, then dried over anhydrous sodium sulfate and finally evaporated to dryness. Recrystallization of the resulting residue from methylene chloride-hexane gave 17α-methyl-$\Delta^6$-dehydroestradiol 3-methyl-ether.

The 6,7-double bond in this product was then chlorinated according to the procedure of Example I, to give a mixture of 6α,7α-, 6β,7α-, 6α,7β- and 6β,7β-dichloro-17α-methylestradiol 3-methyl ether. One portion of this isomeric mixture was carefully chromatographed to separate the individual isomers. A second portion (1 gram) was hydrolyzed by first admixing it with 30 cc. of acetic acid and 0.5 cc. of an aqueous 2 N solution of hydrochloric acid and allowing the resulting reaction mixture to stand at room temperature for 5 hours. The reaction mixture was then diluted with ice water, extracted with methylene chloride and the extract washed to neutrality with water, dried over anhydrous sodium sulfate and evaporated to dryness. Crystallization from acetone-hexane followed by careful chromatography separated the 6α,7α-, 6β,7α-, 6α,7β- and 6β,7β-dichloro derivatives of 17α-methylestradiol, with the 6α,7α- and 6β,7α-dichloro isomers predominating.

*Examples X and XI*

The procedure employed in Example IX was repeated in every detail in these examples except for the following. In Example X, methyl magnesium bromide was replaced by an equivalent amount of vinyl magnesium bromide, while in Example XI, methyl magnesium bromide was replaced by an equivalent amount of ethinyl magnesium bromide. In addition, the chlorinating agent used to chlorinate the 6,7-double bond in the resulting 17α-vinyl- and 17α-ethinyl-$\Delta^6$-dehydroestradiol 3-methyl ethers was N-chloro succinimide rather than chlorine itself. This procedure gave the 6α,7α-, 6β,7α-, 6α,7β- and 6β,7β-dichloro derivatives of 17α-vinyl- and 17α-ethinyl estradiol 3-methyl ether, with the 6α,7α- and 6β,7α-dichloro isomers predominating in each case. Hydrolysis of these products by the procedure given in Example IX gave the corresponding 3-free hydroxy compounds, i.e., 6α,7α-, 6β,7α-, 6α,7β- and 6β,7β-dichloro-17α-vinyl estradiol and 6α,7α-, 6β,7α-, 6α,7β- and 6β,7β-dichloro-17α-ethinyl estradiol.

*Example XII*

To a solution of 1.4 grams of potassium in 30 cc. of t-amyl alcohol, contained under a nitrogen atmosphere in a suitable reaction vessel, there was added a solution of 1 gram of Δ⁶-dehydroestrone 3-acetate in 30 cc. of anhydrous, thiophene-free benzene. Following this addition, a slow current of purified acetylene was passed through the solution for 40 hours. Next, the solution was diluted with water and extracted with benzene, and the organic extracts were washed to neutral and dried over anhydrous sodium sulfate. Evaporation of the solvent and chromatography of the resulting residue on 70 grams of alkaline alumina, with elution by a mixture of hexane-benzene (2:3, respectively), gave in the hexane-benzene fraction a product which was then recrystallized from acetone-hexane to give 17α-ethinyl-Δ⁶-dehydroestradiol 3-acetate. Chlorination of the 6,7-double bond in this product according to the procedure of Example I gave a mixture of 6α,7α-, 6β,7α-, 6α,7β- and 6β,7β-dichloro-17α-ethinyl estradiol 3-acetate. Before chromatographically separating this mixture of the 6,7-dichloro isomers 1 gram thereof was admixed with 1 gram of p-toluenesulfonic acid monohydrate, 50 cc. of acetic acid and 25 cc. of acetic anhydride and allowed to stand at room temperature for 24 hours. Following this reaction period the reaction mixture was poured into ice water and stirred until the excess anhydride was hydrolyzed. Then, the product was isolated by extraction with methylene chloride, the extract was evaporated to dryness and the resulting residue was recrystallized from acetone-hexane. Careful chromatography of this recrystallized product gave 6α,7α-, 6β,7α-, 6α,7β- and 6β,7β-dichloro-17α-ethinyl estradiol 3,17-diacetate, with the 6α,7α- and 6β,7α-dichloro isomers predominating.

It will be obvious to those skilled in the art that other changes and variations can be made in carrying out the present invention without departing from the spirit and scope thereof as defined in the appended claims.

I claim:
1. A compound represented by the general formula:

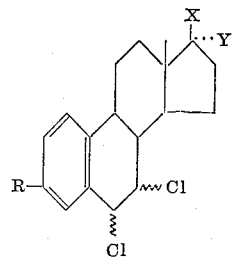

wherein R is a member selected from the group consisting of a hydroxyl group, an acyloxy group containing less than 12 carbon atoms and an ether group containing less than 8 carbon atoms, X is a member selected from the group consisting of a hydroxyl group and an acyloxy group containing less than 12 carbon atoms; Y is a member selected from the group consisting of hydrogen, a lower alkyl group, a lower alkenyl group and a lower alkinyl group, and X and Y taken together represent a keto group.
2. 6,7-dichloroestrone.
3. 6,7-dichloroestrone 3-acetate.
4. 6,7-dichloroestrone 3-methyl ether.
5. 6,7-dichloroestradiol.
6. 6,7-dichloroestradiol-3-benzyl ether.
7. 6,7-dichloroestradiol 17-acetate.
8. 6,7-dichloroestradiol 3,17-diacetate.
9. 6,7-dichloroestradiol-3-methyl ether 17-acetate.
10. 6,7-dichloro-17α-methyl-estradiol.
11. 6,7-dichloro-17α-methyl-estradiol-3-methyl ether.
12. 6,7-dichloro-17α-vinyl-estradiol.
13. 6,7-dichloro-17α-vinyl-estradiol-3-methyl ether.
14. 6,7-dichloro-17α-ethinyl-estradiol.
15. 6,7-dichloro-17α-ethinyl-estradiol 3-methyl ether.
16. 6,7-dichloro-17α-ethinyl-estradiol 3-acetate.
17. 6,7-dichloro-17α-ethinyl-estradiol 3,17-diacetate.

References Cited in the file of this patent
Bruckner et al.: Chem. Berichte, vol. 94, May 1961, pp. 1225–1249.